United States Patent Office 3,420,988
Patented Jan. 7, 1969

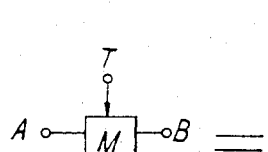
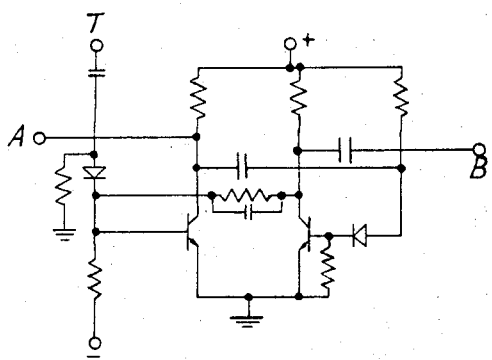
MONOSTABLE CIRCUIT
Fig.3.b
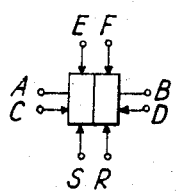
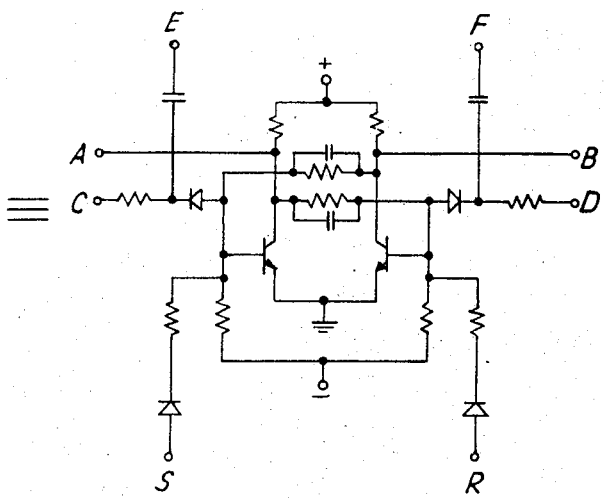
BISTABLE CIRCUIT
Fig.3.a

3,420,988
DIGITAL COUNTING EQUIPMENTS
Robert William Hunt, Eric Lindsay Jones, and Peter Bonner, London, England, assignors to International Standard Electric Corporation, New York, N.Y., a corporation of Delaware
Filed May 17, 1965, Ser. No. 456,248
Claims priority, application Great Britain, May 25, 1964, 21,564/64
U.S. Cl. 235—92             4 Claims
Int. Cl. G06f 1/02

ABSTRACT OF THE DISCLOSURE

Digital counting equipment whereby intervals of predetermined duration between triggering pulses derived from a standard frequency source form the time basis by which the range and the counting period are automatically determined. The range is indicated by a movable decimal point on the display the position of which is proportional to elapsed time, and the duration of the counting period is additionally dependent on the most significant digit being filled prior to a predetermined maximum number of time intervals for any one counting period being reached. The display means includes a warning device activated whenever a count exceeds a predetermined limit, and an additional digit to permit a change in range other than simultaneously with the count display reading the most significant digit.

---

This invention relates to digital counting equipments.

According to the present invention there is provided an electrical digital counting arrangement including a plurality of digital display positions for displaying the result of counting a finite series of input pulses wherein the duration of counting is determined either by the available display positions becoming filled or the counting period attaining a predetermined period of time, whichever is the first, and wherein the range of the display is automatically indicated by means of a movable decimal point in accordance with the actual duration of the count so as to make optimum use of the available display positions.

Figure 1:
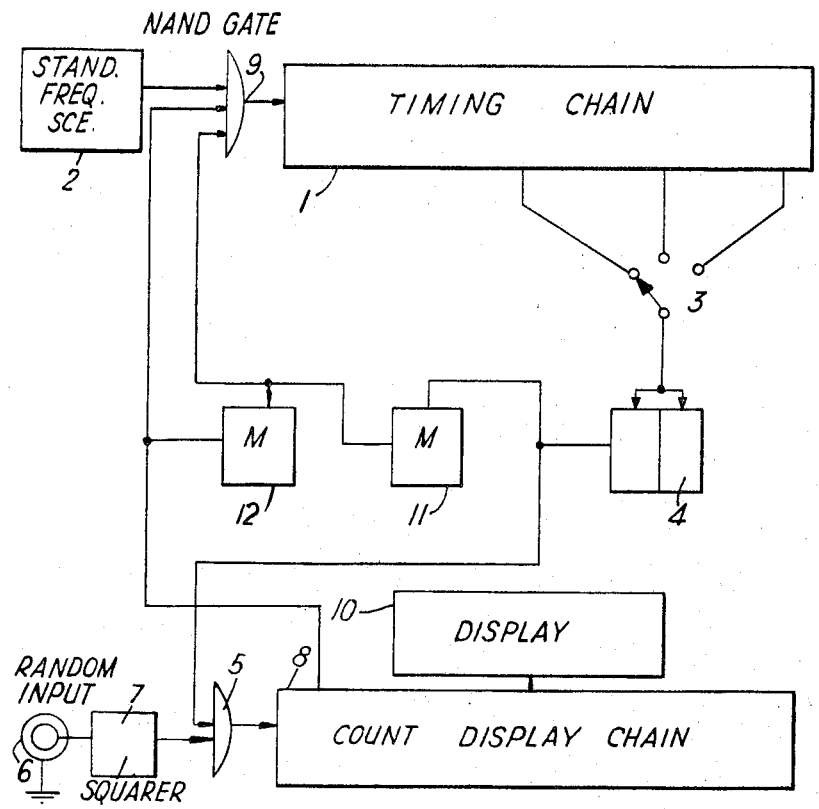
Figure 2:
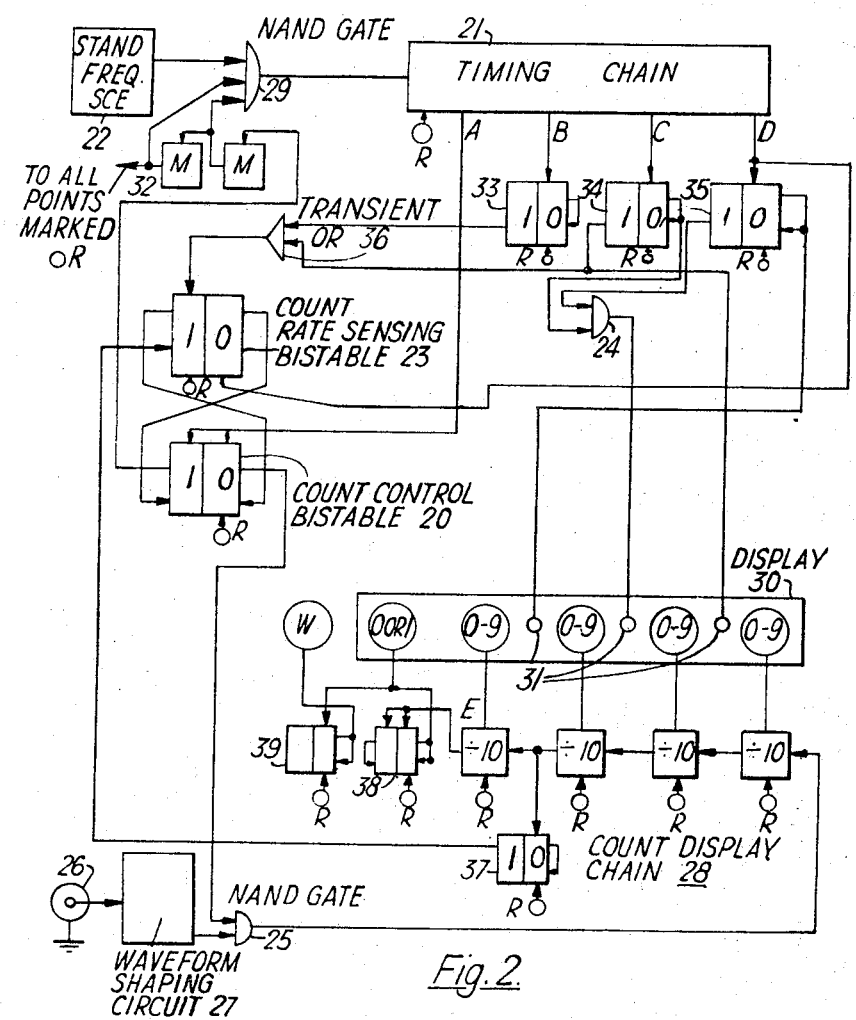

Embodiments of the invention will now be described with reference to the accompanying drawings in which FIG. 1 is a diagram of a simple pulse counting circuit;

FIGURE 2 is a diagram of a pulse counting circuit with provision for automatic adjustment of the range according to the rate of input of pulses thereto; and FIGURES 3a and 3b show detailed circuit arrangements which may be employed in the circuits of the other two figures.

The circuits to be described utilize binary logic, that is they have two stable complementary states, referred to as 0 state and 1 state.

An inverter circuit has a single input circuit and gives an output signal which is the complement of the input signal. Thus if the input is 0, the output is 1, and vice versa.

An OR circuit has two or more inputs and one or more outputs. Its output signal is 1 whenever any one or more of the input signals is 1. The output is 0 only when all of the input circuits are at 0.

An AND circuit also has two or more inputs and one or more outputs. Its output signal is 0 whenever any one or more of the input signals is 0. The output is 1 only when all of the input signals are at 1.

NOR and NAND circuits are equivalent to OR and AND circuits respectively followed by an inverter stage.

A bistable circuit has two stable states and will only change from one state to the other when a trigger pulse is applied to one of its input circuits.

A monostable circuit has one stable and one quasi-stable state. A trigger pulse applied to an input circuit causes the monostable circuit to change to the quasi-stable state from which it returns to the stable state after a predetermined interval of time, determined by circuit parameters.

The drawing shown in FIGURE 1 represents a known form of counting circuit which may be used to count the number of pulses occurring within a fixed interval of time. Its method of operation is as follows.

A timing chain 1, which consists of a series of decade counters, is fed from a standard frequency source 2, through the NAND gate 9. The source may, for example, be considered to be operating at a frequency of 1 mc./s. Outputs from the timing chain occur when a pulse overfills one decade counter and is passed on to the next in the series. Outputs, in this illustration, are derived respectively at intervals of 0.01 second, 0.1 second and 1.0 second and appear at the contacts of the switch 3. This switch is set manually to select pulses for transmission to a count control bistable circuit 4, which converts the received train of pulses into a square-wave form, having a repetition rate equal to half that of the received train of pulses.

The square wave output is fed to a gate 5 which is opened by the ON period of the wave. Thus a 0.01 second (10 ms.) pulse output from the timing chain 1 causes the gate 5 to be opened for 10 ms. periods and closed for 10 ms. periods.

An input of random pulses to be counted is fed in at 6, and is passed to a squarer circuit 7 to improve discrimination. The pulses are fed through the gate 5 when this is held in the open position, to a count displaying chain 8. The number of pulses from the random input arriving at the count display chain 8 in the 10 ms. period is indicated on a display panel 10, which many consist for example, of neon numerical display tubes.

In order to allow sufficient time for the display to be read before it is reset, the timing chain 1 is disconnected from the frequency source 2 for several seconds at a time by the operation of the monostable circuit 11. A pulse which opens gate 5 also operates the monostable circuit 11. This in turn closes the gate 9 and prevents further pulses from being derived from the timing chain whilst it is in its quasi-stable state. After this present interval, which may be several seconds, the monostable circuit 11 returns to its stable state and reopens gate 9, allowing the process to repeat itself. The numerical reading at the display 10 is held during this time.

In returning to the stable state, the monostable circuit 11 operates a further monostable circuit 12 which clears the display.

The range of the display in the above circuit has to be set manually. The drawing of FIGURE 2 shows a pulse counting unit in which the manual change is obviated and the available positions in the read-out display are used to much greater advantage. Although the unit is described as having a neon tube display, it could equally well employ a print-out display or any other suitable method.

A similar basic counting principle is employed, but an additional feedback circuit from the count display chain to the count control bistable circuit adjusts the period of the count so that the maximum number of display positions gives a significant indication of further circuit monitors the time required for the count and gives an indication of range based on this time.

Referring now to FIGURE 2, the count control bistable circuit is shown at 20, the count display chain at 28 and the timing chain at 21.

The count control bistable circuit is under the overriding control of the count rate sensing bistable circuit 23, and this is in turn controlled by the timing chain 21 through the transient OR gate 36, and by the count display chain through the feedback circuit including the bistable circuit 37.

At the commencement of a count, all bistable circuits, with the exception of the count rate sensing bistable circuit 23, are switched to the 0 state by means of a pulse input at the position R. The count rate sensing bistable circuit is switched to the 1 state in a similar way.

By way of illustration, a source frequency of 1 mc./s. is again employed. Pulses from the standard frequency source 22 are passed by way of the NAND gate 29 to the timing chain 21. After a period of 100 microseconds has elapsed a pulse is derived from the position A on the timing chain 21 and this triggers the count control bistable from 0 to 1.

The time at which this change occurs is taken as $t=0$ for the operation of the system.

The output from the count control bistable circuit 20, opens a NAND gate 25, which allows pulses from the random input 26 to be fed via the waveform shaping circuit 27 to the count display chain 28, for successive counting by a series of decade counters there indicated. A count of ten in each divider gives rise to a single output pulse to the succeeding divider, whilst at the same time, each pulse as it is counted is recorded on the appropriate device in a display unit 30.

After 99 periods of 100 microseconds have elapsed from $t=0$, a pulse is dervied from point B on the timing chain 21, and is fed to bistable circuit 33, which changes from 0 to 1. An output from this circuit passes through the transient OR gate 36 into the trigger input of the count rate sensing bistable circuit 23. This will only have an effect on that bistable circuit (23) if a further bistable circuit 37 is in the 1 state, which in turn will occur only if the count display chain 28 has a digit in its most significant position E. Should this not be so, and the bistable circuit 37 is in the 0 position, the count rate sensing bistable circuit 23 will not change. In this way, the count display chain is monitored, and is in the latter case found to be insufficiently full for any action to be taken.

If the count rate sensing bistable circuit 23 has not changed condition the count continues, and a pulse is derived from the point C on the timing chain after 99.9 milliseconds from $t=0$. In a similiar manner to the pulse from point B, this pulse operates on the count rate sensing bistable circuit 23 via the transient OR gate 36 and in this case the bistable circuit 34. As previously, the count rate sensing bistable circuit will not change its state if bistable circuit 37 is in the 0 state.

Assuming that the pulse output from C did not change the condition of the count rate sensing bistable circuit 23, the equipment awaits another pulse, which is derived from point D on the timing chain 21 after 999.9 milliseconds. This pulse changes the condition of the count rate sensing bistable circuit 23, regardless of the state of the bistable circuit 37. This pulse defines the longest counting period used in the equipment of FIGURE 2. In this case, for input pulse rates of less than 1000 p.p.s. the four digit display positions would not be filled. Extra stages added to the timing chain 21, the count display chain 28 and the display unit 30 would enable 100 p.p.s., 10 p.p.s., etc., to fill the display.

If the mean rate of pulse input from the random input 26 is higher than considered above, a digit may have entered the most significant position E of the count display chain 28 before the completion of the period of either 9.9 ms. or of 99.9 ms. in other words, before a pulse has been derived from point B of the timing chain 21, or before one has been derived from point C of the timing chain. This transfer of a digit to the last decade unit E of the count display chain 28 changes the condition of the bistable circuit 37 and this in turn permits a change in the condition of the count rate sensing bistable circuit 23, on receipt of the next pulse derived from the timing chain 21. A change in state of the count control bistable circuit 20, to follow that of the count rate sensing bistable circuit, is now permitted. After a delay of 100 microseconds from the time that the pulse from point B on the timing chain 21, changed the condition of the count rate sensing bistable 23, a pulse from point A on the timing chain will change the condition of the count control bistable circuit 20 and cut off the input to the count display chain 28 by closing the NAND gate 25.

By the above means, the input to the chain 28 is kept open for just sufficient time to obtain a digit in each of the four decade positions of the display.

The pulse which closes the gate 25 is a clock pulse, and not a derived pulse, and hence the time period for which the chain 28 is being filled is not subject to errors due to the operating time of intermediate circuits.

The decimal point indicator (31 in the display 30) in this case consisting of small neon tubes, is driven by amplifiers (not shown) and the selection of which neon is to operate is bistable circuits 33, 34 and 35 controlled from points B, C and D on the timing chain 21. AND gate 24 assists in the selection of the pertinent neon tube.

A fifth digit position is included in the display 30. The object of this addition is to prevent indecision at the change from (say) 99.99 to 100.00. Overfilling of the last decade counter of the count display chain 28 will cause a change of condition of the bistable circuit 38 which changes the fifth digit neon numerical display tube from 0 to 1. In practice the 0 condition is suppressed so that a 1 indication is made where there was no indication before. Indecision will occur at some other point, however, as the range of the display has to be changed as explained in the preceding paragraphs. It is possible to so arrange the operation of the circuit that this change occurs at 99.99 to 100.0, but such operation arrangement would require careful adjustment and frequent re-adjustment. The provision of the fifth digit and the adjustment to change ranges at some other figure, such as 108.99 to 109.0, removes the necessity for fine adjustment and for re-adjustment, because a drift of the critical point would have no deleterious effect on the operation of the equipment.

It is possible that a certain amount of "hunting" can occur at the critical point, that is successive displays could be, say, 108.99, 0108.9, 108.99. The first 0 in the second display quoted is suppressed in the equipment but included here for clarity. Such "hunting" leads to no loss of accuracy beyond the fact that the counter does not round off the decimal but merely produces the digits it is capable of displaying. Such hunting would result from small variations in the propagation delays. To illustrate the critical point, first consider the condition in which the bistable circuit 37 changes its condition before the pulse from point B, say, arrives. The count rate sensing bistable circuit 23 is able to change its condition and hence allow the count control bistable circuit 20 to change on the arrival of the next clock pulse from point A, after the 100 microsecond delay. No change in the position of the decimal point will result. Now consider the condition in which the bistable circuit 37 changes its condition after the pulse from part B arrives. The bistable circuit 23 is not able to change its condition, hence the bistable circuit 20 will not change its condition with the arrival of the next clock pulse. It is necessary to await the arrival of the pulse from C to change the condition of the bistable circuit 23 and allow the rest of the changes to take place. The range of the display will be changed in this case. At the critical point very small variations in the relative timing of the change of condition of bistable circuit 37 and the arrival of pulses from the timing chain 21 determine whether or not the range is to be changed.

The count display chain 28 is completed by binary stage 39 which is triggered by overflow from the binary stage 38. Binary stage 39 is a triggered bistable circuit which operates an alarm signal which indicates that the count display chain is overfull, that is the input frequency has risen above the design limit. Should the design limit be 1 mc./s. on the four main digit positions, the warning will operate when 1.9999 mc./s. is exceeded. A suitable warning would be the operation of a buzzer, or of a panel light. Such a warning device is indicated as W in the figure.

Suitable arrangements for the bistable circuits and monostable circuits hereinbefore mentioned are as shown in FIGURES 3a and 3b respectively.

In the bistable circuit of FIG. 3a normal inputs are available at R and S and triggered inputs at E and F. Trigger control inputs are provided at C and D and outputs at A and B.

Input to the monostable circuit of FIG. 3b is at T and outputs at A and B.

In the following claims the expression "timing means" refers to the apparatus for generating the timing pulses at switch 3 while "counting means" refers to the apparatus which counts the pulses from gate 5 and provides counting outputs.

It is to be understood that the foregoing description of specific examples of this invention is not to be considered as a limitation on its scope.

What we claim is:

1. Apparatus for counting electrical pulses comprising timing means for periodically generating timing clock pulses, counting means for counting the received electrical pulses, display means including a plurality of digital display positions operatively connected to the counting means for displaying the pulse count, and gate means interconnecting all of the above means so as to limit the duration of counting to the first-to-occur of the two events of the display means becoming full or the expiration of a selected time period, with said timing means including a standard frequency source operatively connected to a timing chain whereby the input pulses are counted during one or more periods defined by the time to count a predetermined number of clock pulses from a standard source, and wherein the counting means includes apparatus for generating a signal upon the occurrence of a count representative of the most significant digit position whereby the absence of such generated signal permits counting of the input pulses for a further period.

2. Apparatus according to claim 1 in which the timing means includes decade counters which provide output pulses after predetermined numbers of said clock pulses are received, said output pulses activating the gating means for terminating or continuing the count according to whether or not the counting means' most significant position contains a digit.

3. Apparatus for counting input electrical pulses comprising a standard frequency source, timing chain means responsive to the standard frequency source for periodically generating timing pulses, count display chain means for counting the electrical pulses occurring between generated timing pulses, display means including a plurality of digital display positions operatively connected to the count display chain means for displaying the pulse count, and gate means interconnecting the source of electrical pulses, standard frequency source, timing chain means, count display chain means and display means whereby the duration of counting is determined either by the available display positions becoming filled or the counting period continuing for a predetermined period of time, whichever occurs first and wherein the range of the display is automatically indicated by means of a movable decimal point, the said display means including means for displaying an additional digit so that said adjustment of range may be initiated other than simultaneously with the count display reading the most significant digit.

4. Apparatus according to claim 3 in which the display means includes warning means for indicating when the count exceeds a predetermined limit for which said arrangement was adjusted.

References Cited

UNITED STATES PATENTS

| | | | |
|---|---|---|---|
| 2,803,405 | 8/1957 | Howell | 235—92 |
| 3,017,093 | 1/1962 | Rowley | 235—92 |
| 3,039,685 | 6/1962 | Bagley | 235—92 |
| 3,171,953 | 3/1965 | Young | 235—92 |

MAYNARD R. WILBUR, *Primary Examiner.*

G. J. MAIER, *Assistant Examiner.*